United States Patent
Sternowski

(10) Patent No.: US 9,173,088 B1
(45) Date of Patent: Oct. 27, 2015

(54) VEHICULAR MOBILE DEVICE ALARM SENSOR

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 14/483,600

(22) Filed: Sep. 11, 2014

Related U.S. Application Data

(60) Provisional application No. 61/945,987, filed on Feb. 28, 2014.

(51) Int. Cl.
*H04M 3/42* (2006.01)
*H04W 8/22* (2009.01)

(52) U.S. Cl.
CPC ...................................... *H04W 8/22* (2013.01)

(58) Field of Classification Search
CPC ........................................................ H04W 8/22
See application file for complete search history.

(56) References Cited

U.S. PATENT DOCUMENTS 8,731,530 B1    5/2014   Breed et al.

*Primary Examiner* — Erin File
(74) *Attorney, Agent, or Firm* — Jason R. Sytsma; Shuttleworth & Ingersoll, PLC

(57) ABSTRACT

The presence of an RF signal in an expected location emanating from a mobile device within the expected location is detected by first antenna positioned in the expected location. False alarm discrimination is achieved by the square ratio of the operator's cellphone signal close to the antenna(s) versus the blocked external signals from much greater distance. A comparator compares the RF signal emanating from the mobile device in the expected location with a threshold signal and determines whether the mobile device is operating, and, if so, an alarm responsive to the comparator is triggered.

19 Claims, 3 Drawing Sheets

VEHICULAR MOBILE DEVICE ALARM SENSOR

This application claims priority to U.S. Provisional Application No. 61/945,987 filed Feb. 28, 2014, the entirety of which is hereby incorporated by reference herein.

BACKGROUND

This disclosure relates to a system and method for alerting to the use of a mobile device by a vehicle operator, and more specifically, this disclosure relates to discriminating between multiple sources of radio frequency signals to identify the use of a mobile device by the operator of the vehicle.

As mobile telephones have come into widespread use, people often use their mobile phones while driving vehicles. This is a dangerous activity that can significantly distract the driver's attention from driving-related task, which can significantly increase the risk of traffic violations and driving accidents. Commercial operators have banned all use of mobile devices in vehicles, but compliance is difficult to track, especially when other occupants in the vehicle may be permitted to use their mobile devices. This is especially relevant for commercial carriers.

Accordingly, it is desirable to provide a system and method which are operative to alert the owners or authorities to unauthorized mobile device use by the operator of a commercial carrier with reduced susceptibility to false alarms from the use of mobile devices by others in the proximate vicinity.

SUMMARY

A system for detecting a presence of an RF signal in an expected location emanating from a mobile device within the expected location is disclosed. The system includes a first antenna positioned in the expected location for detecting the RF signal emanating from the mobile device in the expected location. A comparator compares the RF signal emanating from the mobile device in the expected location with a threshold signal and determines whether the mobile device is operating, and if so, an alarm responsive to the comparator is triggered.

A detector communicatively coupled to the antenna detects a characteristic of the RF signal, such as a power level, a phase, or a voltage, and converts the detected characteristic to a signal for the comparator to compare with the threshold signal. A fixed or variable filter network can be communicatively coupled to the antenna to pass only the frequency bands of interest. The filter network can be a single band pass or band stop filter or a combination of band pass or band stop filters each configured to pass a frequency band of interest. The threshold is set according to the RATIO of the expected received radio power from a cellphone very close to the operator versus the power received from a cellphone whose signal is at a much greater distance outside the vehicle and/or attenuated by the seat shield or the operator's body. False alarms are minimized by placing the antennas near the expected operating locations, while simultaneously minimizing extraneous signals by means of attenuation or taking advantage of the square law diminuation of radio power versus distance (causing the operator cellphone to generate a significantly stronger power at the antenna).

False alarms can be reduced by including shielding between the expected location of the mobile device and likely sources for additional RF signals. The shielding can, for example, be placed in the back or head rest of the seat to block RF signals originating from behind the vehicle operator. False alarms are further minimized by utilizing the RF-absorptive characteristic of human tissue to prevent signals from opposite sides of the operator's body from reaching the antenna.

Further aspects and examples of embodiments of at least one invention described herein will be made apparent in the following Detailed Description and the appended claims.

DETAILED DESCRIPTION

Figure 2A:
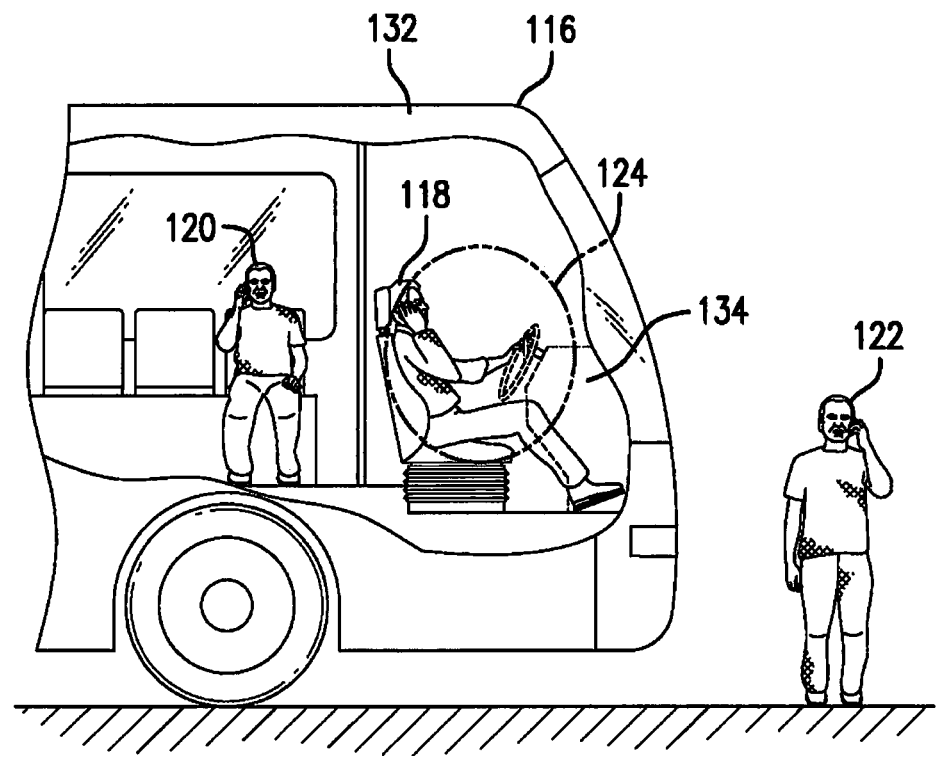
FIG. 2A is a side view depiction of the operating environment for the system of FIG. 1.

A system 100 is disclosed that detects the use of a mobile device 102, such as a cellphone, tablet, and the like, during the operation of a vehicle 116 (shown in FIG. 2A). The use of mobile device 102 by an operator 118 (shown in FIG. 2A) operating vehicle 116, which can be transit busses, trucks, school busses, trains, subways, automobiles with young drivers, etc., is banned for safety reasons, either by law or by organization rules. Enforcement of such rules requires determining when mobile device 102 is in use by the operator 118 and rejecting false alarms. System 100 produces an actionable alarm signal when mobile device 102 is in violation of law or operational rules. System 100 uses a combination of techniques to ensure that mobile device 102 produces the strongest signal received by system 100 to minimize false alarms.

System 100 overcomes unique problems associated with detection of mobile device 102 by operator 118 of vehicle 116 while minimizing false alarms. Typical problems include disregarding signals from mobile devices used by passengers 120 (shown in FIG. 2A) or pedestrians 122 (shown in FIG. 2A) in close proximity to vehicle 116, disregarding signals from other devices in vehicle 116, and sensing signals spread throughout the available signal spectrum that is available for use by any device manufacture.

Figure 1:
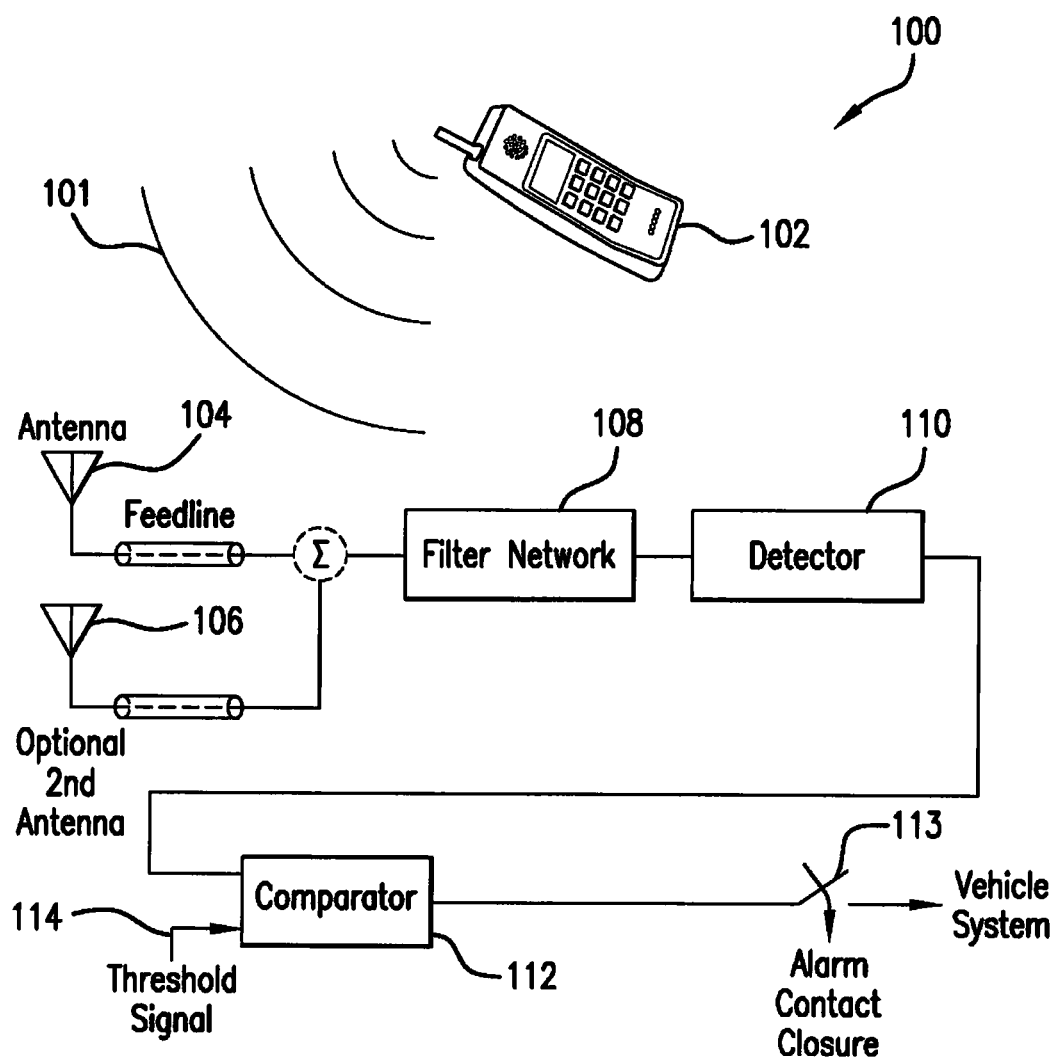
FIG. 1 is a schematic diagram of a mobile device alarm system.

FIG. 1 shows system 100. A first antenna 104 and a second antenna 106 are each positioned to take advantage of the propagation of an RF signal 101 to maximize its detection and minimize false alarms. The positioning of first antenna 104 and second antenna 106 is discussed more thoroughly below.

Figure 4:
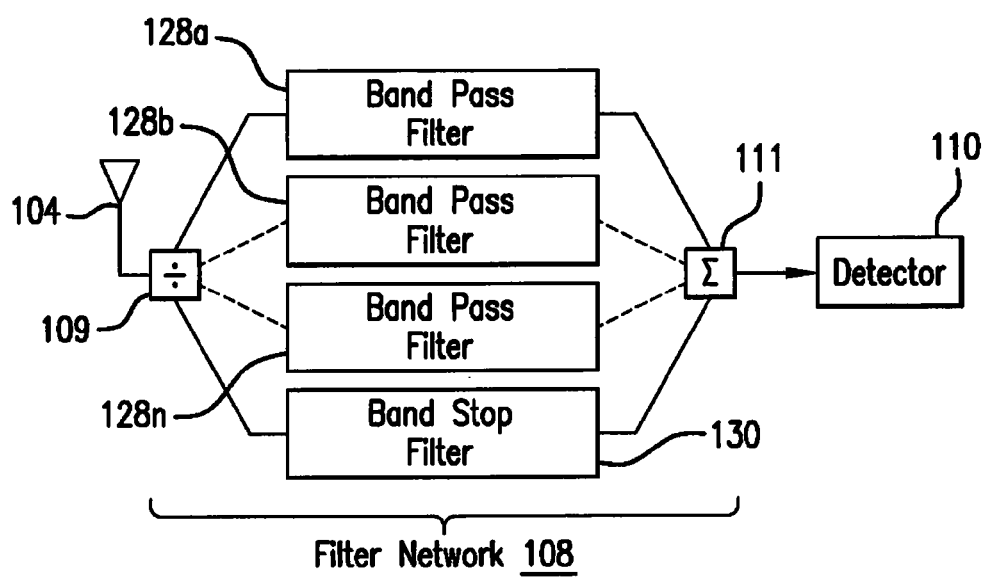
FIG. 4 is a schematic of a filter network used in the system of FIG. 1.

A filter network 108 is communicatively coupled to first antenna 104 and second antenna 106 to receive and filter RF signal 101 to pass only the portion of RF signal 101 corresponding with the communication channel(s) or the frequency bands of interest likely used by mobile device 102. Referring to FIG. 4, filter network 108 can include a power splitter 109 to split the received signal into multiple n-bands. Power splitter 109 can be any conventional signal splitting component, including a passive or active component, or frequency selective network.

The multiple n-bands from power splitter 109 are used for separate filtering by a bank of variable or fixed filters, which can include band pass filters 128a-n and a band stop filter 130

(or any combination thereof), each configured to pass a single frequency band of interest. Filters 128 and 130 remove unwanted frequencies, so that only the RF signals found in the channels used by mobile devices are received by detector 110 to minimize false alarms. Variable filters configured as low pass, band pass, high pass, or any combination thereof can be used for selective programming the filters to correspond with one or more expected channels used by mobile devices and can have their bandwidth increased to cover a broader frequency range or narrowed to reduce false alarms. The filtered signals are recombined by a power combiner 111 and passed to detector 110. Power combiner 111 can be any conventional signal combining component, including a passive or active component, or frequency selective network.

Detector 110 and a comparator 112 cooperate to extract and compare a characteristic of RF signal 101 with a reference signal to determine whether operator 118 of vehicle 116 is using mobile device 102, and if so, an alarm 113 is triggered. A characteristic of RF signal 101 can be the power level, the phase, the voltage, etc., and detector 110 can be a power detector, phase detector, a voltage detector, etc.

Detector 110 can be a power detector that converts an applied radio power to a proportional direct current signal. That direct current signal is then compared to a threshold signal 114, either predetermined or adaptively computed, either by circuit or hardware. Threshold signal 114 is set according to the ratio of the expected received power from mobile device 102 very close to operator 118 versus the power received from a mobile device whose signal is at a much greater distance outside vehicle 116 and/or attenuated by methods described below. False alarms are minimized by placing first antenna 104 and second antenna 106 in or near expected location 124, while simultaneously minimizing extraneous signals by means of attenuation or taking advantage of the square law diminution of radio power versus distance, which is described in more detail below.

More specifically, threshold signal 114 can be dynamically adjusted by sampling external RF signals and comparing it to the expected level of mobile device 102 used by operator 118. Threshold signal 114 can be a dynamic threshold signal derived from a separate antenna positioned away from expected location 124 and optimized to receive signals from expected external sources, and a detector circuit, similar to detector 110 described for receiving RF signal 101 from mobile device 102 in expected location 124. The output of this detector is used as threshold signal 114 and compared to the output of detector 110. If the radio power direct current signal exceeds the value of threshold signal 114, then an alarm is generated.

The expected power from mobile device 102 can be determined by the calculating the "free space loss" between mobile device 102 and first antenna 104 and second antenna 106, then comparing all RF signals to this value. The power level of RF signal 101 at first antenna 104 or second antenna 106 varies as the inverse of the square of the distance from the transmitter, i.e. mobile device 102, which is referred to as "free space loss." In free space, all electromagnetic waves (radio, light, X-rays, etc.) obey the inverse-square law which states that the power density of an electromagnetic wave is proportional to the inverse of the square of the distance from a point source. Doubling the distance from the source means that the power density of the radiated wave at that new location is reduced to one-quarter of its previous value. The energy from the RF signal induced in first antenna 104 and second antenna 106 is inversely related to the square of the distance between the source (i.e. mobile device 102 and pedestrian's 122 mobile device) and the antenna (e.g. first antenna 104 and second antenna 106) in free space. Free space loss can be utilized to identify operator's 118 mobile device 102 by considering the ratio of power from an expected location 124 (shown in FIG. 2A) of mobile device 102 and any potentially false alarm mobile devices at greater distances or outside expected location 124.

Figure 2B:
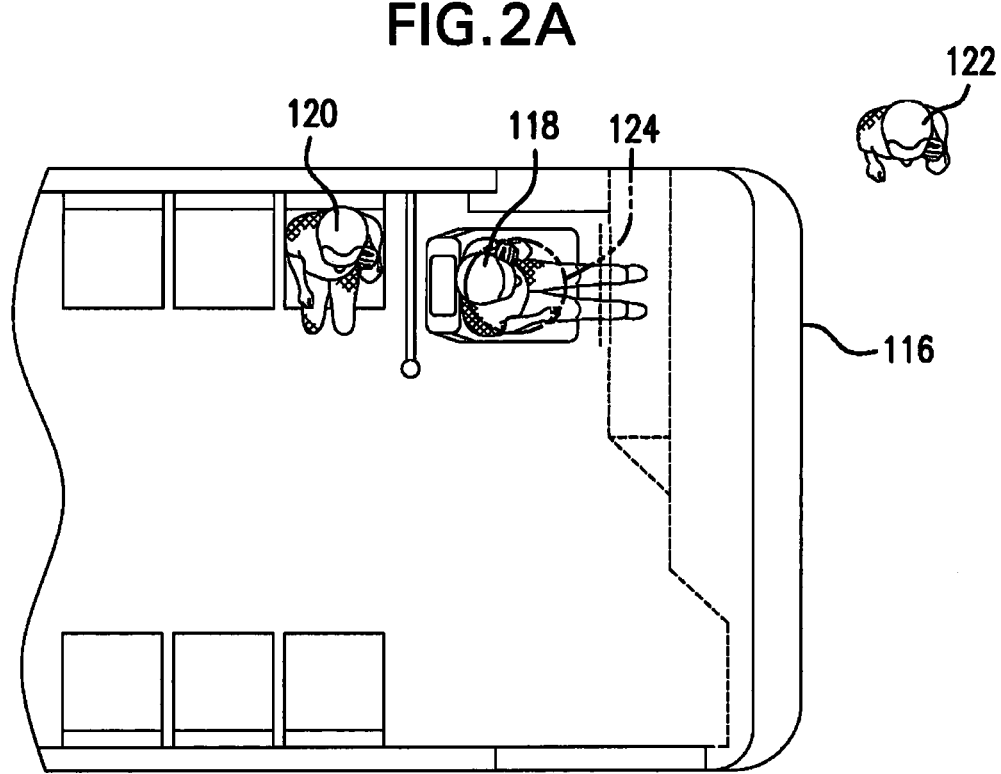
FIG. 2B is a top view depiction of the operating environment for the system of FIG. 1.

FIGS. 2A and 2B show operator 118 driving vehicle 116, which is a transit bus with one or more passengers 120. Expected location 124 is a 24-inch radius extending from the operator's 118 head to his lap in order for operator 118 to hear the audio signal or to see the keypad or display of mobile device 102. Expected location 124 can be increased or decreased as the situation requires. When operator 118 in a sitting position, mobile device 102 will most likely be at the ear of operator 118 or in front of the chest of operator 118 for typing or viewing mobile device 102.

To minimize false alarms, system 100 maximizes the amount of power from RF signal 101 received by the mobile device 102 that first antenna 104 and second antenna 106 receive by positioning first antenna 104 and second antenna 106 as close to the expected operating location as possible. This means that the RF signal 101 from mobile device 102 will be the strongest signal at first antenna 104 or second antenna 106 compared to other radio signals from other locations.

Prior attempts for detecting mobile device 102 utilize directional antennas that point toward the presumed location of the operator's cellphone. This approach counts on the directional characteristics of the chosen antenna. At cellular frequencies, however, mobile device 102 and antenna will be in the near-field, and the directional characteristics of the antenna will typically be marginal. For this reason, first antenna 104 and second antenna 106 can be omnidirectional antennas with RF shielding 126 and shielding from the metal inherent in vehicle 116, and shielding or attenuation inherent in the human body of operator 118, to attenuate external radio signals, all of which is described more fully below.

Figure 3A:
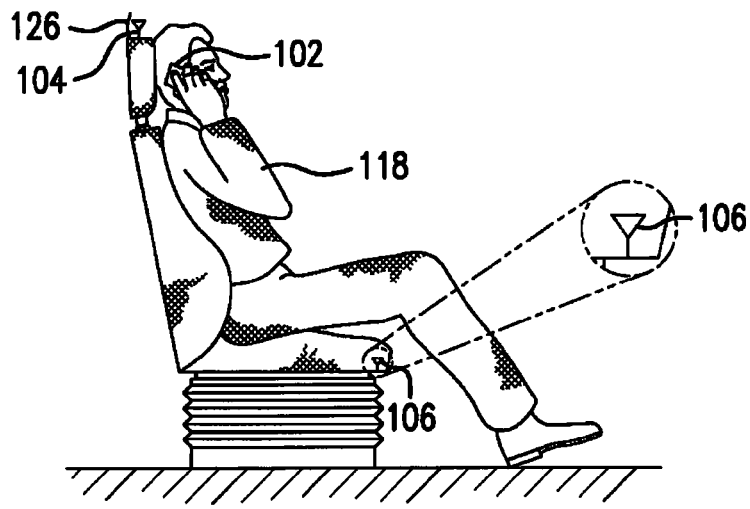
FIG. 3A is a side view that illustrates the RF shielding used in the driver's seat, as well as the operator's body-position with respect to the antennas, to reduce the susceptibility of false alarms.
Figure 3B:
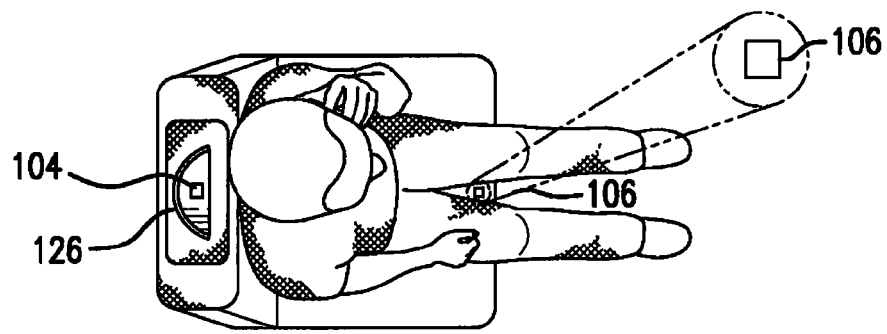
FIG. 3B is a top view of the illustration of FIG. 3A.

FIGS. 3A and 3B show operator 118 using mobile device 102 near his ear. First antenna 104 is positioned on the headrest of the seat near the ear of operator 118. Second antenna 106 can be positioned near an upper front edge and center of the seat of operator 118, which is still in expected location 124 to detect RF signal 101 when mobile device 102 is in the lap of operator 118. FIGS. 3A and 3B are for illustrative purposes, and one skilled in the art would recognize that first antenna 104 could be integrated into the head rest toward the front and near the ear of operator 118 or positioned to at any other location in or near the seat within expected location 124, or multiple antennas could be added, for example, a second antenna 106 can be integrated into the seat cushion to detect a mobile device in use in the lap of operator 118.

By positioning first antenna 104 and second antenna 106 in expected location 124, the free space loss to mobile device 102 will be small, perhaps on the order of 5-10 inches. Conversely, the free space loss between first and second antennas 104 and 106 and a mobile device from pedestrian 122 in front of vehicle 116 while stopped is probably 60 inches away or more. The ratio of the free space loss between first antenna 104 and second antenna 106 and mobile device 102 and pedestrian's 122 mobile device may be 60/6. From the ratio of the distances, a discrimination ratio that represents the difference in expected power levels from operator's 118 mobile device 102 and the mobile device of pedestrian 122 can be found by the formula:

$$20 * \text{LOG}(60/6) = 20 \text{ decibels} = 100:1$$

A discrimination ratio of 1-3 dB is generally considered an acceptable threshold for distinguishing between RF signals. Each doubling of the distance between first antenna 104 or second antenna 106 and pedestrian's 122 mobile device adds an additional 6 dB, or double, the discrimination ration between positive and false alarms. A 20 dB discrimination ratio can easily distinguish between RF signal 101 from mobile device 102 and other RF signals.

Radio signals emanating from other devices can be attenuated or blocked by shielding first antenna 104 and second antenna 106 in expected location 124 with one or more RF shields 126. FIGS. 3A and 3B show RF shield 126 positioned behind, with respect to operator 118, first antenna 104 and second antenna 106. RF shield 126 can be a sheet, foil, or wire mesh of metal or any other material that blocks radio signals. Its position behind antenna 104 will block RF signals emanating from back seat passengers 120. Additional RF shields 126 can be placed elsewhere in the seat, such as in the back rest, or elsewhere in vehicle 116.

Further RF shielding of expected location 124 is obtained by the placement of first antenna 104 and second antenna 106 with respect to components of vehicle 116. Referring back to vehicle 116 in FIGS. 2A and 2B, vehicle 116 comprises a significant amount of metal, which blocks or reflects RF energy, and, in this regard, blocks or reflects much of the straight-line RF energy emanating from sources outside vehicle 116, thereby minimizing the false alarms. Vehicle 116 may comprise a body 132 made from aluminum or other metal that generally surrounds vehicle 116, except for the windows and the substantially metal under carriage, Vehicle 116 also includes a dash board 134 in front of operator 118 that may be made of metal or contain metal components and wiring, but also likely positioned in front of a metal fire shield (not shown) between the metal engine and operator 118. Other metal, including electrical wiring and flooring may be used throughout vehicle 116. All of this metal serves to block or reflect RF energy from outside vehicle, 116 and proper placement of first antenna 104 and second antenna 106 can greatly attenuate the amount of received RF signals from outside sources.

Even more RF shielding of expected location 124 can be found by properly placing first antenna 104 and second antenna 106 with respect to operator 118. The human body is approximately 95% saline water, which is a highly conductive, and therefore, blocks or reflects RF signals in a manner similar to the metal found in vehicle 116.

Reference has been made to several components throughout this disclosure as though each component is a unique component. One skilled in the art will readily recognize, however, that the various systems and processors can be incorporated into one or more other systems and processors thereby reducing the number of components. For example, detector 110 and comparator 112 can be incorporated into a processor that also generates or determines threshold signal 114, and the processor can be connected to the vehicle system. Furthermore, system 100 can be a combination of analog and digital systems, for example, an analog to digital convertor with pre-processing amplifiers and filters can convert RF signal 101 from first antenna 104 and second antenna 106 to a digital signal for filtering by filter network 108. The invention is also useful in non-vehicular applications where the operator position is constrained so that close proximity of the target mobile device to sensor antenna(s) can be maintained.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A system operable to detect a presence of an RF signal emanating from a mobile device in an expected location, the system comprising:
   a first antenna positioned in the expected location operable to detect the RF signal emanating from the mobile device in the expected location;
   a comparator operable to compare the RF signal emanating from the mobile device in the expected location with a threshold signal and determining whether the mobile device is operating; and
   an alarm responsive to the comparator operable to alert to an operation of the mobile device, wherein the threshold signal is dynamically adjusted by sampling RF signals emanating from outside the expected location and comparing the RF signals to a value for the RF signal emanating from the mobile device in the expected location.

2. The system of claim 1, and further comprising a detector communicatively coupled to the first antenna operable to detect a characteristic of the RF signal.

3. The system of claim 2, wherein the characteristic of the RF signal is one chosen from a power level, a phase, and a voltage.

4. The system of claim 1, wherein the expected location includes a driver's seat, and wherein the first antenna is located near a top of the driver's seat.

5. The system of claim 1, and further comprising a second antenna positioned in the expected location.

6. The system of claim 1, and further comprising an RF shield positioned behind the first antenna to reduce false alarms by substantially blocking RF signals emanating from locations outside the expected location.

7. The system of claim 5, and further comprising an RF shield positioned behind the second antenna to reduce false alarms by substantially blocking RF signals emanating from locations outside the expected location.

8. The system of claim 1, and further comprising a filter network operable to pass only a frequency band of interest in the RF signal.

9. The system of claim 8, wherein the filter network includes at least two filters each operable to pass a single frequency band of interest.

10. A system operable to detect a presence of an RF signal emanating from a mobile device in an expected location, the system comprising:
    a first antenna positioned in the expected location operable to detect the RF signal emanating from the mobile device in the expected location;
    a comparator for comparing the RF signal emanating from the mobile device in the expected location with a threshold signal and determining whether the mobile device is operating; and
    an alarm responsive to the comparator operable to alert to an operation of the mobile device, wherein the threshold signal is set according to a ratio of a power level of the RF signal emanating from the mobile device in the expected location and a power level of an RF signal from another source.

11. The system of claim 10, wherein the first antenna is positioned behind an operator of the mobile device in the expected location to attenuate the RF signal from the other source.

12. The system of claim 11, wherein the first antenna is positioned in a vehicle behind an operator of the mobile device in the expected location so that a body of the operator attenuates the RF signal from the other source emanating from a position in front of the operator.

13. The system of claim 11, wherein the first antenna is position in a vehicle behind a metal of the vehicle so that the metal of the vehicle attenuates the RF signal from the other source emanating from a position in front of the metal of the vehicle.

14. A method for detecting a presence of an RF signal emanating from a mobile device in an expected location, the method comprising:
   detecting an RF signal in the expected location;
   comparing the RF signal with a threshold signal;
   determining whether the RF signal is emanating from the mobile device in the expected location;
   alarming when the RF signal is emanating from the device in the expected location; and
   sampling RF signals emanating from outside the expected location and comparing the RF signals to a value for the RF signal emanating from the mobile device in the expected location.

15. The method of claim 14, and further comprising shielding the expected location with an RF shield positioned behind a first antenna to reduce false alarms by attenuating RF signals emanating from locations outside the expected location.

16. The method of claim 14, and further comprising filtering out a portion of the RF signal that does not correspond with a communication channel for the mobile device.

17. The method of claim 14, and further comprising shielding the expected location with an operator of the mobile device to attenuate RF signals emanating from locations outside the expected location.

18. The method of claim 14, and further comprising shielding the expected location with a portion of a vehicle to attenuate RF signals emanating from locations outside the expected location.

19. A system operable to detect a presence of an RF signal emanating from a mobile device within an expected location in a vehicle, the system comprising:
   a first antenna positioned in the expected location behind an operator of the mobile device so a body of the operator attenuates an RF signal emanating from other sources and positioned behind a metal portion of the vehicle so that the metal portion of the vehicle attenuates the RF signal emanating from other sources, wherein the first antenna detects the RF signal emanating from the mobile device in the expected location;
   an RF shield positioned behind the first antenna to reduce false alarms by substantially blocking RF signals emanating from locations outside the expected location;
   a comparator operable to compare the RF signal emanating from the mobile device in the expected location with a threshold signal and determining whether the mobile device is operating, wherein the threshold signal is set according to a ratio of a power level of the RF signal emanating from the mobile device in the expected location and a power level of an RF signal from another source, wherein the threshold signal is set according to a ratio of a power level of the RF signal emanating from the mobile device in the expected location and a power level of an RF signal from another source; and
   an alarm responsive to the comparator operable to alert to an operation of the mobile device.

\* \* \* \* \*